(12) United States Patent
Briley et al.

(10) Patent No.: US 6,191,839 B1
(45) Date of Patent: Feb. 20, 2001

(54) PATTERNED THERMAL SENSOR

(75) Inventors: Joseph H. Briley, Marion; Gregory E. Davis, Cedar Rapids, both of IA (US)

(73) Assignee: Rockwell Collin, Inc., Cedar Rapids, IA (US)

( * ) Notice: Under 35 U.S.C. 154(b), the term of this patent shall be extended for 0 days.

(21) Appl. No.: 09/303,729

(22) Filed: May 3, 1999

(51) Int. Cl.[7] .................................................. G02F 1/1333
(52) U.S. Cl. ................................................................ 349/161
(58) Field of Search ............................................... 349/161

(56) References Cited

U.S. PATENT DOCUMENTS

| | | | |
|---|---|---|---|
| 5,694,191 | * | 12/1997 | Strathman et al. .................. 349/161 |
| 5,775,221 | * | 7/1998 | Baumgartner, Jr. .................. 349/161 |
| 5,886,736 | * | 3/1999 | Wolkowicz et al. ................. 349/161 |
| 5,914,764 | * | 6/1999 | Henderson ........................... 349/161 |
| 5,936,696 | * | 8/1999 | Daijogo ................................ 349/161 |

FOREIGN PATENT DOCUMENTS

WO 98/29779 * 7/1998 (WO) ................................... 349/161

* cited by examiner

*Primary Examiner*—James A. Dudek
(74) *Attorney, Agent, or Firm*—Nathan O. Jensen; Kyle Eppele; J. P. O'Shaughnessy

(57) ABSTRACT

An LCD heater and method having temperature sensors made by electrically isolating portions of ITO across a display surface and measuring the resistance of such portions and developing an assessment of temperatures in the interior of the display surface based on sensor calibration data taken under known temperature conditions.

20 Claims, 1 Drawing Sheet

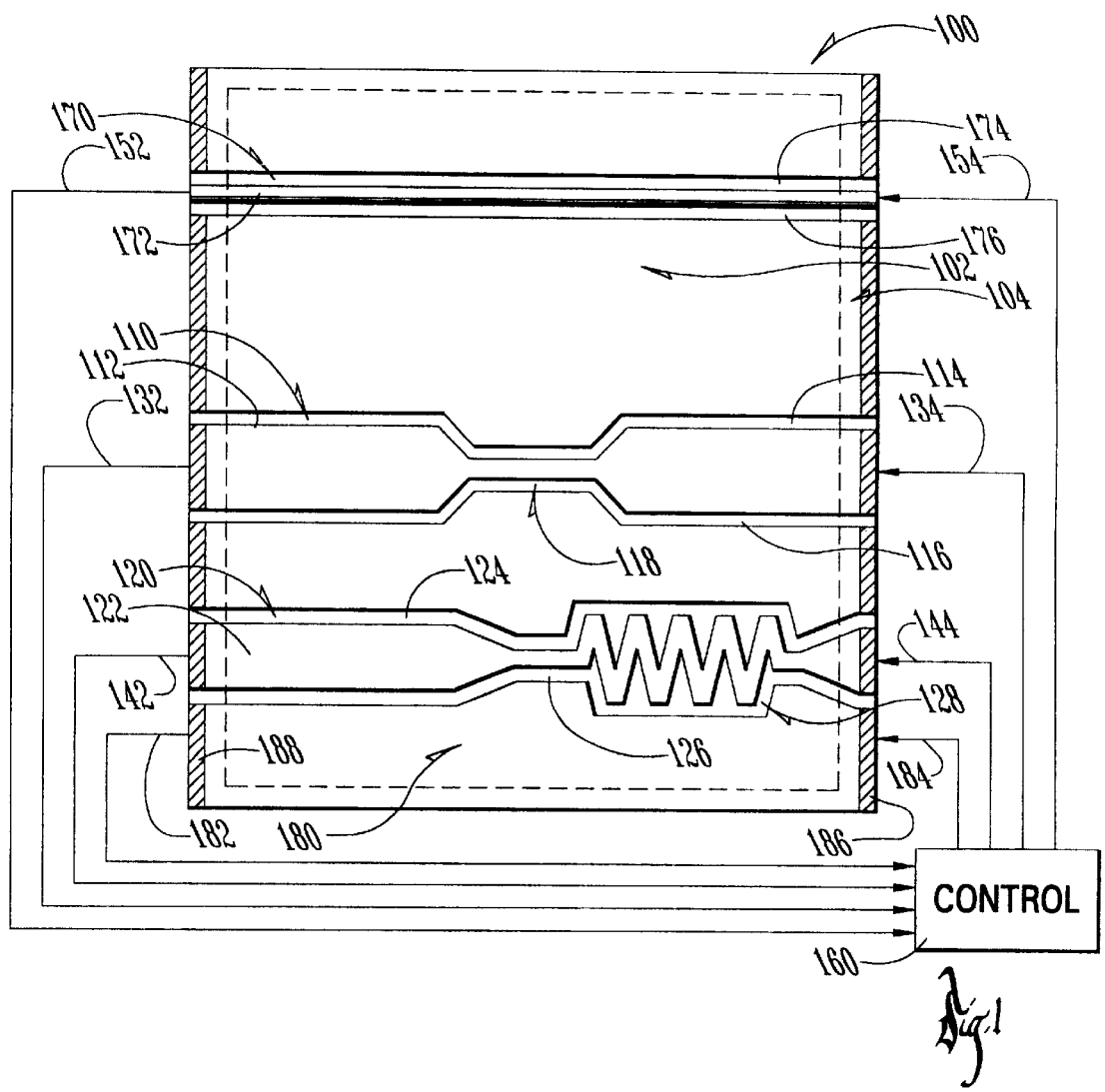
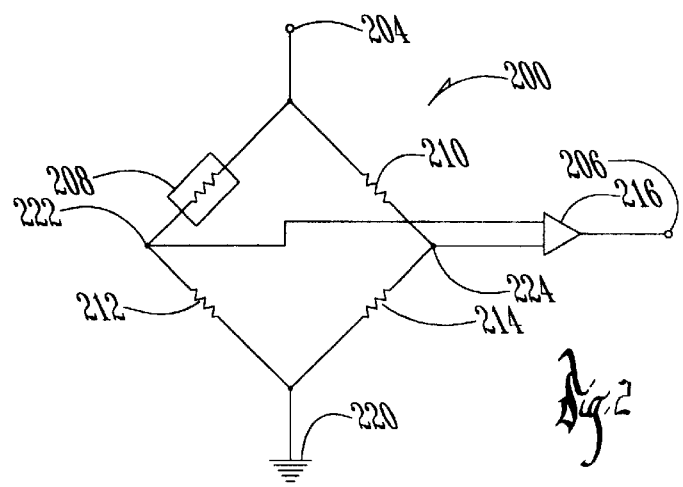

PATTERNED THERMAL SENSOR

BACKGROUND OF THE INVENTION

The present invention relates to liquid crystal displays (LCDs) and more particularly relates to LCD heaters and even more particularly relates to controls for LCD heaters.

In the past, LCD heater plates have been incorporated to provide a uniform temperature across the LCD surface. The heater has typically been deposited material such as indium tin oxide (ITO) applied to a glass cover placed adjacent to the liquid crystal layer within the display. Electrical current is then passed through the ITO coating across the display face to generate uniform heating.

Available temperature sensors, for providing feedback to thermal controls functions, are opaque and too large to be placed within the stacked layers comprising the display. Consequently, the thermal sensors have been placed about the periphery to provide information about the temperature of the LCD material. This method has limitations for determining the temperature of the central portion of the display and extent of thermal gradients present.

Thermal gradients form across the surface of the display due to non-uniform flow of heat from the liquid crystal material to the adjacent environment and display housing.

Consequently, there exists a need for improved thermal sensing across the LCD assembly, in order to provide better thermal management of the display.

SUMMARY OF THE INVENTION

It is an object of the present invention to provide an improved image for LCDs.

It is a feature of the present invention to include a thermal sensor disposed inwardly of the LCD periphery.

It is an advantage of the present invention to better assess the temperature gradient existing across an LCD viewing surface.

It is another object of the present invention to reduce visual discontinuities at interior portions of the LCD viewing surface.

It is another feature of the present invention to include a thermal sensor device made of transparent materials.

It is another advantage of the present invention to reduce visual discontinuities caused by placing opaque materials in the viewing surface of an LCD.

It is yet another object of the present invention to provide an LCD heater control device which is readily manufacturable.

It is yet another feature of the present invention to include a void in a heater surface across the viewing surface of an LCD.

The present invention is a method and apparatus for heating an LCD which is designed to satisfy the aforementioned needs, provide the previously stated objects, include the above-listed features and achieve the already articulated advantages.

Accordingly, the present invention is a method and apparatus providing a thermal sensor in an interior portion of an LCD viewing surface and controlling the LCD based upon an output of the sensor that is substantially invisible to the unaided eye.

BRIEF DESCRIPTION OF THE DRAWINGS

The invention may be more fully understood by reading the foregoing description of the preferred embodiments of the invention in conjunction with the appended drawings wherein:

FIG. 1 is a simplified diagram of an LCD heater and control of the present invention.

FIG. 2 is a schematic diagram of a portion of the control function of FIG. 1.

DETAILED DESCRIPTION

Now referring to the drawings, wherein like numerals refer to like matter throughout, and more particularly to FIG. 1, there is shown a simplified representation of an LCD heater plate, of the present invention, generally designated 100, having a viewable surface 102 with a non-viewable surface periphery 104 disposed therearound. Viewable surface 102 may have a transparent resistive heating element such as a film of ITO, or other transparent electrically conductive material, disposed thereon. Non-viewable surface periphery 104 is a common arrangement for LCDs where there may be drive electronics or periphery thermal sensors (not shown). A first thermal sensor 110 is shown having a first thermal sensor main body 112 with a first thermal sensor upper electrical isolation void 114 disposed adjacent thereto. First thermal sensor upper electrical isolation void 114 may be of various shapes and dimensions; however, it may be preferred that the dimensions of first thermal sensor upper electrical isolation void 114 be small enough to provide for electrical isolation of first thermal sensor main body 112 with the remainder of viewable surface 102. First thermal sensor 110 may be a transparent conductor, such as ITO or other known similar material having otherwise suitable characteristics. Also shown adjacent to first thermal sensor main body 112 is first thermal sensor lower electrical isolation void 116, which may be very similar to first thermal sensor upper electrical isolation void 114. First thermal sensor 110 has a first thermal sensor sensing region 118 disposed therein which may be made of the same material as first thermal sensor main body 112. The first thermal sensor sensing region 118 is disposed at a region on viewable surface 102 in which a temperature determination is desired. First thermal sensor sensing region 118 has different dimensional characteristics, with respect to first thermal sensor main body 112, which will result in differing electrical resistance therethrough at differing temperatures.

Also shown is second thermal sensor 120, which is similar in function to first thermal sensor 110, but is disposed at a different location on said viewable surface 102. Second thermal sensor 120 has a second thermal sensor main body 122, a second thermal sensor upper electrical isolation void 124, and a second thermal sensor lower electrical isolation void 126 associated therewith in a fashion similar to first thermal sensor 110. Second thermal sensor 120 is shown having a second thermal sensor sensing region 128 therein, which has a differing shape characteristic from first thermal sensor sensing region 118. Various shapes may be used for such sensing regions, and the precise shape or configurations are a matter of design detail which is capable of numerous variations depending upon particular requirements or desires of a particular LCD thermal sensor. The designs shown are merely representative of these countless possible variations.

Also shown disposed on viewable surface 102 is third thermal sensor 170, which has a third thermal sensor main body 172, third thermal sensor upper electrical isolation void 174, and third thermal sensor lower electrical isolation void 176 in a fashion similar to first thermal sensor 110, first thermal sensor main body 112, first thermal sensor upper electrical isolation void 114, and first thermal sensor lower electrical isolation void 116 respectively. Third thermal sensor 170 is shown disposed at a predetermined distance from first thermal sensor 110. Third thermal sensor 170 is shown as a uniform design across the surface of heater plate 100 and may be used as a reference for better assessing the temperature at first thermal sensor sensing region 118.

First thermal sensor 110, second thermal sensor 120, and third thermal sensor 170 are coupled to control device 160 through first thermal sensor first line 132 and first thermal sensor second line 134; second thermal sensor first line 142 and second thermal sensor second line 144; and third thermal sensor first line 152 and third thermal sensor second line 154, respectively.

Also shown coupled to viewable surface 102 is first heating strip 180 having first heating strip right side contact 186 and first heating strip left side contact 188 coupled thereto is first heater drive line 182 and second heater drive line 184, which represent potentially numerous other drive lines coupled to other heating portions of viewable surface 102 to produce heat in a well known manner.

The LCD heater plate 100 of the present invention may be constructed using known manufacturing techniques such as etching and masking. Etching the previously deposited ITO from surfaces 102 and 104 or masking surfaces 102 and 104 during the ITO deposition phase, can be used to arrive at the first thermal sensor 110, second thermal sensor 120, and third thermal sensor 170.

Another point about sensor placement and shape upon the LCD heater plate 100 is that placement and shaping of the sensor element governs the size of the sensing area, as to whether it is localized (118, 128) or averaging (172) across the display surface.

Another consideration is that the LCD heater plate 100 can be comprised of many thermal sensors embedded between thermal heat strips, an example of which is first heating strip 180. The quantity of sensors applied to the LCD heater plate 100 depends upon the display application and the designer's need for thermal management to meet specified requirements.

In operation, viewable surface 102 can be heated by applying a voltage differential across points around non-viewable surface periphery 104, thereby causing current to flow through the heat producing resistive film, all in a well-known manner. Temperature sensors (not shown) disposed adjacent to non-viewable surface periphery 104, can be used to sense the temperature around non-viewable surface periphery 104 in a traditional and well-known manner. Temperature assessments can be made at interior portions of viewable surface 102 by using first thermal sensor 110, second thermal sensor 120, and third thermal sensor 170. Due to the differing electrical and mechanical characteristics of ITO or other similar materials, depending upon its temperature, an assessment of a temperature at a particular region on viewable surface 102 can be made. The LCD heater plate 100 is calibrated by making numerous resistance measurements across first thermal sensor 110, second thermal sensor 120, and third thermal sensor 170 at various known temperatures. Later during operation of LCD heater plate 100 resistance measurements are made at the various sensing regions and compared to resistance levels measured during calibration. An assessment of the present temperature is then readily calculated using known techniques.

Now referring to FIG. 2, there is shown a representative circuit which may be used in assessing the temperature gradient from a central portion of viewable surface 102 and various points around non-viewable surface periphery 104.

The patterned thermal sensor 208, which could be first thermal sensor 110, second thermal sensor 120 or third thermal sensor 170, becomes one leg of a four element resistor bridge that has a voltage applied at circuit point 204 relative to circuit point 220. The other three resistors, 210, 212, and 214, are selected to provide a minimal electrical difference between points 222 and 224 at a specified reference temperature for the thermal sensor 208. As the sensed temperature migrates away from the reference temperature, a voltage differential of positive or negative polarity develops across circuit points 222 and 224. The amplifier 216 buffers this differential, provides gain correction as required by the application, and presents the resultant signal to its output 206.

The output 206 is provided to the thermal control circuits for use in determining how much heater current to provide to LCD heater plate 100 heater elements adjacent to the thermal sensor 208. The thermal control circuits will seek to apply heater power to maintain an application specific voltage differential across circuit points 222.

The circuit 200 is provided for each thermal sensor placed on LCD heater plate 100.

It is thought that the method and apparatus of the present invention will be understood from the foregoing description and that it will be apparent that various changes may be made in the form, construction, steps and arrangements of the parts and steps thereof, without departing from the spirit and scope of the invention or sacrificing all of their material advantages. The form herein described is merely a preferred or exemplary embodiment thereof.

We claim:

1. An LCD heater plate comprising:
 a viewable surface having a non-viewable surface periphery; and,
 said viewable surface having a first thermal sensor disposed thereon and extending from a first point on said non-viewable surface periphery to a second point on said non-viewable surface periphery.

2. An LCD heater plate of claim 1 wherein said first thermal sensor is a resistive element having predetermined electrical resistance characteristics as a function of temperature.

3. An LCD heater plate of claim 2 wherein said first thermal sensor is made of an electrically conductive transparent material.

4. An LCD heater plate of claim 3 wherein said transparent material is indium tin oxide.

5. An LCD heater plate of claim 1 further comprising a second thermal sensor extending from a third point on said non-viewable surface periphery to a fourth point on said non-viewable surface periphery.

6. An LCD heater plate of claim 5 wherein said first thermal sensor and said second thermal sensor are adjacent.

7. An LCD heater plate of claim 6 wherein said first thermal sensor and said second thermal sensor have a first thermal sensor sensing region and a second thermal sensor sensing region, respectively.

8. An LCD heater plate of claim 7 wherein said first thermal sensor sensing region has a different pattern of resistive material therein with respect to said second thermal sensor sensing region.

9. An LCD heater plate of claim 8 having a voltage sensing apparatus coupled to said first thermal sensor and said second thermal sensor.

10. An LCD heater plate of claim 9 wherein said voltage sensing apparatus includes a comparator.

11. An LCD heater plate comprising:
 means for providing variable visual images in response to electrical signal provided thereto;

means for heating said means for providing variable visual images;

means for sensing a temperature at a central position on said means for providing variable visual images, and for providing a temperature signal representative of said temperature; and, means for controlling said means for heating in response to said temperature signal.

12. An LCD heater plate of claim 11 wherein said means for sensing a temperature comprises a resistive element extending from a first side of said means for providing variable visual images in response to electrical signal provided thereto, to a second side of said means for providing variable visual images in response to electrical signal provided thereto.

13. An LCD heater plate of claim 12 wherein said resistive element is a transparent electrically conductive material.

14. An LCD heater plate of claim 13 wherein said resistive element is electrically isolated from said means for thermal sensing.

15. An LCD heater plate of claim 14 wherein said resistive element is constructed of a first material which is identical to second material used to construct said means for heating.

16. An LCD heater plate of claim 15 wherein said means for sensing a temperature further includes a second resistive element.

17. An LCD heater plate of claim 16 wherein said second resistive element has different shape than said first resistive element.

18. A method of heating a liquid crystal display comprising the steps of:

providing a resistive film disposed over a transparent heater panel;

providing a first resistive element extending from a first side of said transparent heater panel to a second side of said transparent heater plate, wherein said first resistive element is electrically isolated from said resistive film;

measuring a resistance characteristic of said first resistive element at various temperatures, and developing a resistance profile as a function of a temperature for said first resistive element; and measuring a resistance of said first resistive element and assessing a temperature of said first resistive element in reliance upon said resistance profile.

19. A method of claim 18 further comprising the step of providing a second resistive element and further developing said resistance profile as a function of a temperature of said second resistive elements.

20. A method of claim 18 wherein said first resistive element is a transparent, electrically conductive, material.

* * * * *